(12) United States Patent
Joshi et al.

(10) Patent No.: US 7,664,989 B2
(45) Date of Patent: Feb. 16, 2010

(54) AUTOMATED SOFTWARE TESTING ARCHITECTURE USING A MULTI-LEVEL FRAMEWORK

(75) Inventors: Gururaj Joshi, Bangalore (IN); Krishna Prasad Maruvala, Bangalore (IN)

(73) Assignee: Infosys Technologies Ltd., Bangalore (IN)

( * ) Notice: Subject to any disclaimer, the term of this patent is extended or adjusted under 35 U.S.C. 154(b) by 555 days.

(21) Appl. No.: 11/550,312

(22) Filed: Oct. 17, 2006

(65) Prior Publication Data

US 2007/0094543 A1 Apr. 26, 2007

(30) Foreign Application Priority Data

Oct. 24, 2005 (IN) .................. 1536/CHE/2005
May 26, 2006 (IN) .................. E-2/26/2006-CHE

(51) Int. Cl.
*G06F 11/00* (2006.01)
(52) U.S. Cl. ......................... 714/38; 717/124
(58) Field of Classification Search ............ 714/38
See application file for complete search history.

(56) References Cited

U.S. PATENT DOCUMENTS 7,039,899 B1 * 5/2006 Quiroga .................. 717/115
7,076,713 B1 * 7/2006 Hess .................. 714/741

OTHER PUBLICATIONS

Wilson Mar, "Data Driven Testing," <http://web.archive.org/web/20041031034531/http://www.wilsonmar.com/datadrvt.htm>, 10 pages (Oct. 31, 2004).
Wilson Mar, "Data Driven Testing," <http://www.wilsonmar.com/datadrvt.htm>, 26 pages (accessed Aug. 29, 2006).
Zambelich, "Totally Data-Driven Automated Testing," <http://web.archive.org/web/20040702214246/http://www.sqa-test.com/w_paper1.html>, 14 pages (Jul. 2, 2004).
Seapine Software, "QA Wizard—Automated Testing," <http://web.archive.org/web/20041105091302/http://www.seapine.com/qawizard.html>, 3 pages (Nov. 5, 2004).

(Continued)

*Primary Examiner*—Paul F Contino
(74) *Attorney, Agent, or Firm*—Klarquist Sparkman, LLP

(57) ABSTRACT

A software testing architecture can comprise a three-level framework. The three-level framework can comprise a first level (comprising a first data source), a second level (comprising a second data source), and a third level (comprising a third data source). The framework can further comprise an intermediate entity data source. The first data source can specify test pages, the second test cases for the test pages, and the third test data for the test cases. Each of the three levels can be associated with respective scripts. A method for testing multi-staged scenarios can select test pages and, for the test pages, determine and execute test cases and save intermediate entities. A method for testing multi-staged scenarios using a three-level framework can execute a first test case for a first test page, save an intermediate entity, and execute a second test case for a second test page using the saved intermediate entity.

17 Claims, 8 Drawing Sheets

OTHER PUBLICATIONS

Seapine Software, "QA Wizard Highlights," <http://web.archive.org/web/20040605081304/http://www.seapine.com/qawbenefits.html>, 6 pages (Jun. 5, 2004).

Seapine Software, "QA Wizard Release Notes," <http://web.archive.org/web/20040606013553/http://seapine.com/qawreleasenotes.html>, 6 pages (Jun. 6, 2004).

Seapine Software, "QA Wizard Features and Benefits," <http://downloads.seapine.com/pub/product-info/qawizard_featuresheet.pdf>, 2 pages (accessed Aug. 23, 2006).

Nagle, "Test Automation Frameworks," <http://web.archive.org/web/20031007044809/http://safsdev.sourceforge.net/DataDrivenTestAutomationFrameworks.htm>, 37 pages (Oct. 7, 2003).

Faught, "Keyword-Driven Testing," <http://www.stickyminds.com/pop_print.asp?ObjectId=8186&ObjectType=COL>, 4 pages (Nov. 5, 2004).

Parasoft, "Parasoft's SOAPtest 2.6 Supports WS-Security 2004," <http://web.archive.org/web/20050209183342/http://xml.coverpages.org/Parasoft-WSSecurity.html>, 4 pages (Apr. 15, 2004).

Wikipedia, "Software testing," <http://en.wikipedia.org/wiki/Software_testing>, 9 pages (accessed Sep. 7, 2006).

* cited by examiner

AUTOMATED SOFTWARE TESTING ARCHITECTURE USING A MULTI-LEVEL FRAMEWORK

BACKGROUND

Software testing is becoming increasingly important. Owners, operators, and users of computer software expect and demand high standards of reliability. If a software system, such as a business software application, experiences a failure, data integrity can be affected (e.g., data can be lost or corrupted).

Typically, software testing involves testing of individual software components. For example, software testing can include testing a login screen for various combinations of good and bad login conditions. Software testing can also include testing a data entry form for proper operation using various combinations of input data.

While software testing of individual software components can be a relatively straightforward task, software testing of multiple software components, or multiple applications, such as multiple components or applications of a complex software system, can be difficult. For example, software testing across multiple components or applications may require passing parameters between various testing steps.

A software testing framework for testing a complex software system, such as a system comprising multiple components or applications, can be difficult to maintain. For example, in order to adequately test a complex software system, a large number of test scenarios may be required. Creating and modifying a large number of test scenarios can be time consuming and prone to errors.

Therefore, there exists ample opportunity for improvement in technologies related to software testing of complex software systems.

SUMMARY

A variety of technologies related to software testing of software applications can be applied. For example, a software testing architecture comprising a three-level framework for testing multi-stage scenarios can be provided. The architecture can comprise a first level of the three-level framework comprising an associated first data source. The first data source can specify a plurality of test pages corresponding to a plurality of stages of a multi-staged scenario. The architecture can further comprise a second level of the three-level framework comprising an associated second data source. The second data source can specify a plurality of test cases for the plurality of test pages. The architecture can further comprise a third level of the three-level framework comprising an associated third data source. The third data source can contain test data for the plurality of test cases. The architecture can further comprise an intermediate entity data source configured to store and provide intermediate entities.

Each of the three levels of the three-level framework can be associated with one or more scripts. The scripts can select test pages, select test cases, execute test cases using test data, store and retrieve intermediate entities, and perform other functions related to software testing.

A method for testing multi-staged scenarios of a software application via a three-level software testing framework can be provided. For example, the method can comprise selecting a plurality of test pages. For the plurality of test pages, the method can determine test cases to execute, execute the test cases using test data, and save intermediate entities. Saved intermediate entities can then be reused at a subsequent stage.

A method for testing a multi-staged scenario of a software application using an automated software testing architecture with a three-level framework can be provided. For example, the method can comprise determining (e.g., at a first level of the three-level framework) test pages, selecting (e.g., at the first level) a first test page, determining (e.g., at a second level) a test case to execute, executing (e.g., at a third level) the test case, and saving (e.g., at the third level) an intermediate entity generated as a result of the execution. The method can further comprise selecting (e.g., at the first level) a second test page, determining (e.g., at the second level) a different test case to execute, where executing the different test case (e.g., at the third level) comprises retrieving and using the saved intermediate entity.

The foregoing and other features and advantages of the invention will become more apparent from the following detailed description, which proceeds with reference to the accompanying figures.

DETAILED DESCRIPTION OF EXEMPLARY EMBODIMENTS

EXAMPLE 1

Exemplary Software Testing Framework

Figure 1:
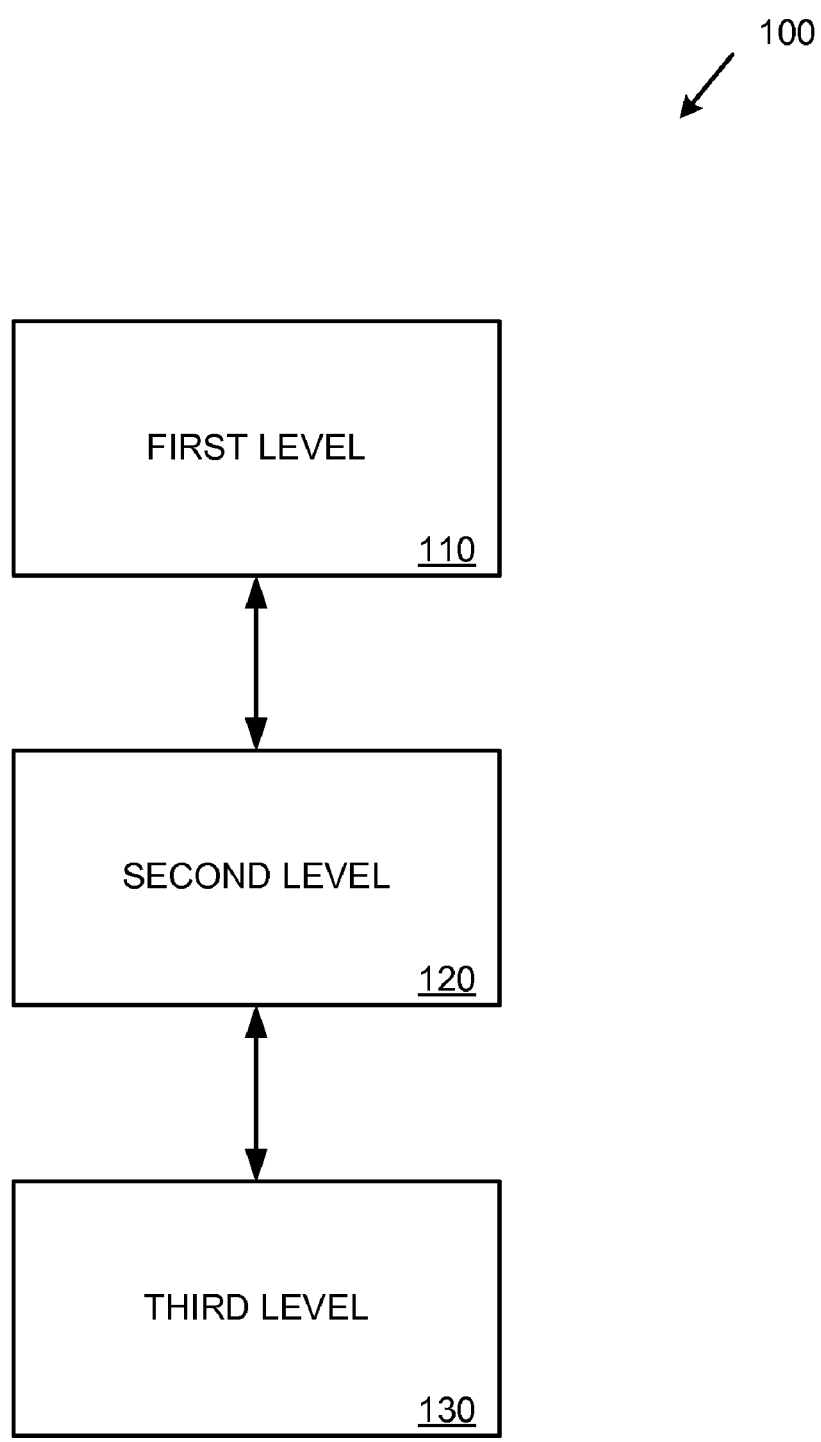
FIG. 1 is a diagram showing an exemplary three-level software testing framework.

In any of the examples herein, a software testing framework can comprise components used to test software (e.g., software applications). For example, a software testing framework can comprise scripts, test pages, data sources, test cases, test data, compiled modules, files, and other types of components.

A software testing framework can be automated. For example, a software testing framework can be used to test multiple aspects (e.g., multiple scenarios) of a software applications automatically (e.g., without user intervention). Automated testing can be accomplished using scripts. For example, a user can setup scripts, data sources, test cases, etc., to test multiple scenarios (e.g., multi-stage scenarios). The user can then initiate the testing process. From there, the scripts can run through the multiple scenarios automatically.

A software testing architecture can comprise a multi-level framework for testing software. For example, a three-level framework can be used to separate scripts and data in order to automate the software testing process. A multi-level framework can also be separated into a different number of levels (e.g., a two-level, four-level, or five-level framework).

EXAMPLE 2

Exemplary Scenario

In any of the examples herein, a scenario can be used to specify one or more steps (e.g., stages) used to test software. For example, a scenario can comprise one or more steps used to test a business process performed using one or more software applications. A scenario can represent a sequence of common or typical steps performed using the software. For example, a scenario can represent a typical sequence of steps performed to open a savings account, execute various transactions, and close the account. A scenario can represent a sequence of steps typically performed over time (e.g., over a lifecycle). For example, a scenario can represent a sequence of steps (e.g., stages) such as: open a checking account, make a deposit via check, make a cash withdrawal, grant an overdraft, and close the account. Outside of the testing environment, the steps of the scenario can typically take place over time (e.g., over days, weeks, months, or years). Testing the steps using a scenario, the steps can be tested at the same time in the same software testing session (e.g., simulating the steps that would typically occur over time).

For example, a scenario can indicate the steps used to test a business process related to a financial application. An example of a scenario used to test a business process of a financial application can comprise the following steps: open a savings account, perform a deposit transaction, perform a withdrawal transaction, calculate interest, check the result of the interest calculation, and close the account.

A scenario can have a number (e.g., an arbitrary number) of variations (e.g., sub-scenarios). Scenario variations can comprise the same steps (e.g., stages), but the detail of each step (e.g., each stage) can be different. For example, if the first step of a particular scenario is to open a savings account, some variations can include: open an individual savings account, open a joint savings account, open a corporate savings account, etc.

A scenario can be a multi-stage scenario. A multi-stage scenario can comprise multiple stages (e.g., steps). A scenario can also be a single-stage scenario (e.g., comprising a single step).

EXAMPLE 3

Exemplary Script

In any of the examples herein, a script can be a software testing script. A script can be created using a computer language (e.g., JAVA™, C++, Perl, etc.) in order to write software testing instructions. One or more scripts can be used to automate the software testing process. For example, scripts can select test pages, select and execute test cases, save and retrieve intermediate entities, etc.

Various vendors provide software testing programs. Typically, software testing instructions are developed for these software testing programs using scripts, which control the software testing program.

Some example software testing programs are: the WinRunner™ testing product provided by Mercury™, and various testing tools provided by IBM® Rational®.

EXAMPLE 4

Exemplary Test Page

In any of the examples herein, a test page can represent a specific testing location within software. For example, a test page can represent a specific page, window, screen, display, aspect, component, or module of a software application to be tested.

An example of a test page can be "open savings account." The "open savings account" test page can refer to a specific account opening page of a software application (e.g., a banking software application). The specific account opening page can contain a number of user interface elements (e.g., fields, lists, buttons, checkboxes, and the like). For example the specific savings account opening page can contain an account type list (e.g., individual, joint, business, etc.), applicant detail fields (e.g., first name, last name, address, etc.), and a submit button.

In some implementations, a test page can be a window, screen, display, or page opened in response to selecting an item from a menu (e.g., a "menu option"). For example, a banking application can have a number of different menus. One of the menus can be an "open account" menu. Menu items in the "open account" menu can be, "open savings account," "open checking account," and "open credit card account." Selecting the "open account" menu and the "open savings account" menu item can result in display of an "open savings account" test page.

A user interface element can be used to navigate to a test page. For example, a button or link can be used to navigate to an "open checking account" page of a banking application.

One or more test pages can be linked together in a scenario. For example, a scenario used to test interest calculations can comprise the following test pages: open savings account, perform a deposit transaction, calculate interest, check result of interest calculation, and close account. Each stage of a multi-stage scenario can correspond to a specific test page.

Test pages can be stored in a data source (e.g., a spreadsheet).

EXAMPLE 5

Exemplary Test Case

In any of the examples herein, a test case can represent a specific test to perform on software using specific test data. A test case can be associated with a test page. For example, one or more test cases can be associated with an "open savings account" test page. The one or more test cases can represent specific types of savings account openings. For example, each of the one or more test cases can be associated with test data. The test data can contain data to use for the one or more test case. For example, a first test case can be associated with test data used to open an individual savings account (e.g., with a specific interest rate). A second test case can be associated with test data used to open a joint savings account (e.g., with a specific interest rate).

Test cases can be stored in a data source (e.g., a spreadsheet).

EXAMPLE 6

Exemplary Test Data

In any of the examples herein, test data can be data for use by test cases. Test data can be stored in various locations, such as a data source. For example, test data can be stored in a database or file (e.g., in a spreadsheet). Test data can comprise various types of data. For example, test data can include values (e.g., numbers, letters, strings, flags, etc.). Test data can also include other types of data (e.g., objects, pointers, handles, etc.).

For example, test data for use by an "open savings account" test case can comprise a specific account type (e.g., individual), personal data (e.g., first name, last name, etc.), a specific currency type (e.g., U.S. currency), and a specific interest rate (e.g., 3.0%).

EXAMPLE 7

Exemplary Data Source

In any of the examples herein, a data source can be a source of information for use by a software testing framework. For example, a data source can be a database, spreadsheet, data file, or the like. A data source can store various types of information. For example, a data source can store test pages, test cases, test data, and intermediate entities.

For example, a spreadsheet data source can be used to store test pages. The spreadsheet can contain information regarding the test pages (e.g., test page name, test page identifier, name of associated test case data source, and execution flag). An execution flag can indicate whether the test page is to be included as part of a scenario.

A spreadsheet data source can be used to store test cases. For example, the spreadsheet can contain information regarding the test cases (e.g., test case name, test case identifier, name of associated test data data source, and execution flag). An execution flag can indicate whether the test case is to be executed as part of a test page.

A spreadsheet data source can be used to store test data. For example, the spreadsheet can contain information regarding the test data (e.g., numbers, letters, strings, flags, object names, keywords, etc.).

EXAMPLE 8

Exemplary Intermediate Entity

In any of the examples herein, an intermediate entity can be an entity generated or produced by software (e.g., by a software application undergoing software testing). An intermediate entity can be any type of data. For example, an intermediate entity can be an account ID generated by a financial software application. Such an account ID can be generated as a result of executing a test case for opening a new account. An intermediate entity can also be, for example, a transaction ID.

Intermediate entities can be saved. For example, states for intermediate entities can be saved in databases, spreadsheets, files, and the like. A saved intermediate entity state (e.g., a value or another type of data) can be reused later. For example, an intermediate entity state that is saved in one stage of a scenario can be reused in a later stage of the scenario.

For example, an intermediate entity, such as an account ID, can be generated as a result of a first stage, such as "open savings account," of a multi-stage scenario. The account ID intermediate entity state can be saved (e.g., in a spreadsheet). In a later stage of the same scenario, such as "perform a deposit transaction," the saved account ID intermediate entity state can be read (e.g., from the spreadsheet) and used to perform the deposit transaction to the account specified by the account ID. Similarly, in a subsequent stage of the same multi-stage scenario, the account ID intermediate entity state can be reused again (e.g., when making a withdrawal from the account or performing an interest calculation on the account).

By using intermediate entities, a complex multi-stage scenario can be tested. For example, if a software application (e.g., a financial application) comprises many pages, components, modules, or sub-applications, an intermediate entity generated by one of the pages, components, modules, or sub-applications can be saved and reused when the testing proceeds to a different (e.g., subsequent) page, component, module, or sub-application.

EXAMPLE 9

Exemplary Three-Level Framework

In any of the examples herein, a three-level framework can be a three-level framework for testing software (e.g., software applications). A three-level framework can be used to separate scripts and data in order to automate the software testing process.

A first level of the three-level framework can include a data source (e.g., a spreadsheet) and one or more scripts. The first level data source can contain a list of test pages and associated parameters for the software application. The first level data source can also be configured to indicate specific test pages that are to be included as part of a multi-stage scenario. The one or more first level scripts can be configured, for example, to set up a scenario (e.g., using parameters stored in the first level data source), determine test pages that are to be included in the scenario, and call second level scripts. The one or more first level scripts can be called wrapper scripts.

For example, if the first level data source is a spreadsheet (e.g., a first level spreadsheet), each row can correspond to a test page. One column of the spreadsheet can then be a flag. If the flag is set for a row, then the corresponding test page can be included in the scenario. For example, a first level script can read through the spreadsheet and include in the scenario the test pages for which the flag is set. Using this technique, a number (e.g., an arbitrary number) of test pages can be set to create a multi-staged scenario. In addition, scenarios can be easily created and modified merely by setting and/or clearing flags in the spreadsheet.

A second level of the three-level framework can include a data source (e.g., one or more spreadsheets) and one or more scripts. The second level data source can contain a list of test cases and associated parameters. The second level data source can be configured to indicate specific test cases that are to be executed for the test page, or test pages, of a scenario (e.g., a multi-stage scenario). The one or more second level scripts can be configured to select the test cases to be executed for the test page(s) selected by the first level script. The one or more second level scripts can be called module scripts.

For example, the second level data source can include a set of spreadsheets (e.g., a set of second level spreadsheets). Spreadsheets from the set can contain test case information for respective test pages. In this way, each of the test pages can have an associated test case spreadsheet. Rows of the spreadsheet can correspond to respective test cases. One column of the spreadsheet can be a flag. If the flag is set for a row, then the corresponding test case can be included when testing the test page. For example, second level scripts can read through the spreadsheets and include, for the selected test pages, the test cases for which a flag is set. Using this technique, a number (e.g., an arbitrary number) of test cases can be executed for each test page of a multi-staged scenario. In addition, test cases can be easily included by setting and/or clearing flags in the spreadsheets.

A third level of the three-level framework can include a data source (e.g., one or more spreadsheets) and one or more scripts. The third level data source can contain test data for the test cases listed in the second level data source. The one or more third level scripts can execute the test cases listed in the second level data source using the test data in the third level data source. The one or more third level scripts can be called test page scripts.

For example, the third level data source can include a set of spreadsheets (e.g., a set of third level spreadsheets). Each spreadsheet from the set can contain test data for the test cases of one of the test pages. In this way, each of the test case spreadsheets can have an associated test data spreadsheet.

EXAMPLE 10

Exemplary Spreadsheets

In any of the examples herein, software testing can be performed using a three-level framework. The three-level framework can utilize three levels of spreadsheets, as data sources, during the testing process. The spreadsheets can contain data and information used to control and direct the testing process.

Table 1 below lists an example first level spreadsheet in the form of a table. In the table, the rows correspond to test pages. For example, the first row (below the heading row) is an "open savings account" test page (e.g., used to open one or more savings accounts with various parameters). The second row is a "deposit" test page (e.g., used to make a deposit, such as a cash deposit, to the savings account). The first column of Table 1 is a "flag" column. If the "flag" column is set (e.g., contains a "y"), then the test page for that row can be included as part of a scenario (e.g., a multi-stage scenario). In Table 1 below, the multi-stage scenario includes four stages: "open savings account," "deposit," "calculate interest," and "close account." This four-stage scenario can represent a typical sequence of business steps (e.g., steps performed for a financial application).

TABLE 1

Example First Level Spreadsheet

| Flag | Test Page Name | Description |
|---|---|---|
| Y | OSA | Open savings account |
| Y | DEP-SA | Make a deposit |
|  | TRAN-SA | Transfer between accounts |
|  | WDR-SA | Make a withdrawal |
| Y | INT-SA | Perform an interest calculation |
| Y | CSA | Close the account |

Table 2 below lists an example second level spreadsheet in the form of a table. The second level spreadsheet listed below in Table 2 lists the test cases for the "OSA" test page from Table 1 above. The second level spreadsheet can be associated with the "OSA" test page, for example, by naming the spreadsheet file with the prefix "OSA_TC." Similarly, the other test pages listed in Table 1 above (e.g., DEP-SA, TRAN-SA, etc.) can each have an associated spreadsheet listing test cases for the associated test page.

In example Table 2, five test cases are listed. Each of the five test cases can be used to open a savings account with a different configuration. Each test case has a unique test case identifier. For example, the first row (below the heading row) lists test case "SCN_SA-1." The first column of Table 2 is a "flag" column. If the "flag" column is set (e.g., contains a "y"), then the test case for that row can be executed as part of the "OSA" test page of the multi-stage scenario.

According to example Table 2, three test cases will be executed when testing the "OSA" test page. As a result, three different savings accounts will be opened with different configurations. Each of the savings account openings can result in generation of an account ID (an intermediate entity), which can be saved and used with subsequent test pages (e.g., when making deposits or withdrawals).

The various test cases of Table 2 can be used to test opening a savings account with various configurations. For example, "SCN_SA-1" can be a test case for opening a savings account for a single individual with a specific interest rate and using a specific currency. "SCN_SA-3" can be a test case for opening a joint savings account with a specific interest rate and using a specific currency. "SCN_SA-4" can be a test case for opening a business savings account with a specific interest rate and using a specific currency. In addition to, or instead of, these configurations, other configurations and parameters can differentiate the test cases. For example, "SCN_SA-1" can be linked to another savings account, while "SCN_SA-2" can be linked to a checking account.

TABLE 2

Example Second Level Spreadsheet

| Flag | Test Case ID | Test Case Description |
|---|---|---|
| Y | SCN_SA-1 | Individual, 3%, U.S. |
|  | SCN_SA-2 | Individual, 4%, Euro |
| Y | SCN_SA-3 | Joint, 3%, U.S. |
| Y | SCN_SA-4 | Business, 5%, Indian |
|  | SCN_SA-5 | Business, 5%, U.S. |

Table 3 below lists an example third level spreadsheet in the form of a table. The third level spreadsheet listed below in Table 3 lists the test data for the test cases listed in Table 2 above. The third level spreadsheet can be associated with the test cases for the "OSA" test page, for example, by naming the spreadsheet file with the prefix "OSA_TD." Similarly, the other test pages listed in Table 1 above can each have an associated spreadsheet containing test data.

Table 3 contains test data for two of the test cases listed in Table 2. The test data for each test case is identified by the unique test case identifier. For example, the test data for test case "SCN_SA-1" begins at the top of the second column (below the header). The test data for test case "SCN_SA-2" begins at the top of the fourth column (below the header). In this way, the test data for each of the test cases listed in the second level spreadsheet (the test case spreadsheet) can be listed in a single test data spreadsheet.

The test data of Table 3 can be used when executing the test cases of Table 2. For example, the "SCN_SA-1" test case can be executed using the test data in the second and third columns of Table 3. The "SCN_SA-2" test case can be executed using the test data in the fourth and fifth columns of Table 3.

TABLE 3

Example Third Level Spreadsheet

| Object | Data | Data | Data | Data |
|---|---|---|---|---|
| Test Case ID | SCN_SA-1 |  | SCN_SA-2 |  |
| UNAM | sa_user1 |  | sa_user1 |  |
| PASS | sa_pass1 |  | sa_pass1 |  |
| WIND_OA | Y |  | Y |  |
| DATA_CustType | Individual |  | Individual |  |
| DATA_Currency | Curr-1 |  | Curr-2 |  |

TABLE 3-continued

Example Third Level Spreadsheet

| Object | Data | Data | Data | Data |
|---|---|---|---|---|
| DATA_Scheme | Scheme-1 | | Scheme-1 | |
| LIST_Int | | 3% | | 4% |
| BUTN_Accept | Y | Y | Y | |
| RESP_AcctID | | 1, 1 | | 1, 1 |
| OPUT_AcctID | | ACCT_ID | | ACCT_ID |
| BUTN_OK | | Y | | Y |
| END | | Y | | Y |

One or more third level scripts can execute the test cases listed in Table 2 using the associated test data from Table 3. For example, a second level script can read through Table 2 and generate a list of test cases (e.g., flagged test cases) to execute. The second level script can then, for each of the test cases in the list, call a third level script and pass the test case ID. The third level script can receive the test case ID, and execute the test case using the test data. The third level script can identify the specific test data using the test case ID.

Using the data in Tables 2 and 3 above, a second level script can identify test cases "SCN_SA-1," "SCN_SA-3," and "SCN_SA-4" to execute as part of a multi-stage scenario. The second level script can pass the three test case identifiers (SCN_SA-1, SCN_SA-3, and SCN_SA-4) to a third level script. The third level script can execute the three test cases using the test data in the third level spreadsheet (partially depicted in Table 3). For example, when executing the "SCN_SA-1" test case, the third level script can start from the "SCN_SA-1" cell and proceed down (and down each subsequent column), reading the test data from the cells, until it reaches the "Y" in the "END" cell (at which point, execution for "SCN_SA-1" is complete).

EXAMPLE 11

Exemplary Naming Convention

In any of the examples herein, a naming convention can be used when implementing a three-level software testing framework. For example, the naming convention can be used for files (e.g., spreadsheet file names), test pages, test cases, test data, and intermediate entities.

For example, a first level spreadsheet can contain information regarding test pages. The test pages can be associated with unique identifiers (e.g., "TP1"). Using the test page identifiers, the second level spreadsheets (containing information regarding test cases) can be named accordingly (e.g., "TP1_TC" for the second level spreadsheet containing test case information associated with the test page "TP1"). Similarly, using the test page identifiers, the third level spreadsheets (containing information regarding test data) can be named accordingly (e.g., "TP1_TD" for the third level spreadsheet containing test data for use when executing the test cases in the "TP1_TC" spreadsheet associated with the "TP1" test page).

The naming convention can be carried through to the test cases. For example, each test case in the second level spreadsheet can be associated with a unique test case identifier (e.g., "TC_A-1"). Similarly, test data associated with each test case can be identified in the third level spreadsheet using the test case identifier.

The naming convention can also be used for intermediate entities. For example, an intermediate entity generated as a result of executing a particular test case (e.g., "TC_A-1") can be associated with the test case identifier (e.g., associated with the test case identifier in an output spreadsheet).

The naming convention can be carried across multiple test pages (e.g., across multiple stages of a multi-stage scenario). For example, a first test page (e.g., "TP1") can be associated with a first test case spreadsheet (e.g., "TP1_TC") listing a number of test cases (e.g., "TC_A-1" to "TC_A-N"), and a first test data spreadsheet (e.g., "TP1_TD") containing test data for use when executing the test cases in the first test case spreadsheet. A second test page (e.g., (e.g., "TP2") can be associated with a second test case spreadsheet (e.g., "TP2_TC") listing a number of test cases (e.g., "TC_A-1" to "TC_A-N"), and a second test data spreadsheet (e.g., "TP2_TD") containing test data for use when executing the test cases in the second test case spreadsheet.

The test cases (e.g., "TC_A-1" to "TC_A-N") can have the same test case identifiers across the multiple test pages of the multi-stage scenario. In this way, scenario variations or sub-scenarios can be implemented, and intermediate entities reused. For example, the first test page, TP1, can be a savings account opening test page. TP1 can be associated with two test cases: TC_A-1 for opening an individual savings account, and TC_A-2 for opening a joint savings account. Intermediate entities can be saved as a result of executing these test cases (e.g., an account ID associated with executing TC_A-1 for opening the individual savings account, and a second account ID associated with executing TC_A-2 for opening the joint savings account). The second test page, TP2, can be a deposit test page. TP2 can be associated with two test cases: TC_A-1 for making a deposit to the account opened by the TC_A-1 test case associated with TP1, and TC_A-2 for making a deposit to the account opened by the TC_A-2 test case associated with TP1. When executing TC_A-1 for making the deposit, the intermediate entity (the saved savings account ID intermediate entity generated when executing TC_A-1 for opening the individual savings account) can be reused. Similarly, when executing TC_A-2 for making the deposit, the intermediate entity (the saved savings account ID intermediate entity generated when executing TC_A-2 for opening the joint savings account) can be reused. In this way, a scenario variation (e.g., a sub-scenario) can be identified using the same test case ID across the multiple test pages of the multi-stage scenario.

EXAMPLE 12

Exemplary Three-Level Software Testing Framework

FIG. 1 shows an exemplary three-level software testing framework 100 for testing software applications. The example framework comprises a first level 110, a second level 120, and a third level 130. The three-level framework can be used to separate scripts and data in order to automate the software testing process.

The first level 110 can include a data source (e.g., a spreadsheet) and one or more scripts. The first level data source can contain a list of test pages and associated parameters for use when testing the software application. The first level data source can also be configured to indicate specific test pages that are to be included as part of a multi-stage scenario. The one or more first level scripts can be configured, for example, to set up a scenario (e.g., using parameters stored in the first level data source), determine test pages that are to be included in the scenario, and call second level scripts. The one or more first level scripts can be called wrapper scripts.

The second level 120 can include a data source (e.g., one or more spreadsheets) and one or more scripts. The second level data source can contain a list of test cases and associated parameters. The second level data source can be configured to indicate specific test cases that are to be executed for the test page, or test pages, of a scenario (e.g., a multi-stage scenario). The one or more second level scripts can be configured to select the test cases to be executed for the test page(s) selected by the first level script. The one or more second level scripts can be called module scripts.

The third level 130 can include a data source (e.g., one or more spreadsheets) and one or more scripts. The third level data source can contain test data for the test cases listed in the second level data source. The one or more third level scripts can execute the test cases listed in the second level data source using the test data in the third level data source. The one or more third level scripts can be called test page scripts.

EXAMPLE 13

Exemplary Method for Testing Software

Figure 2:
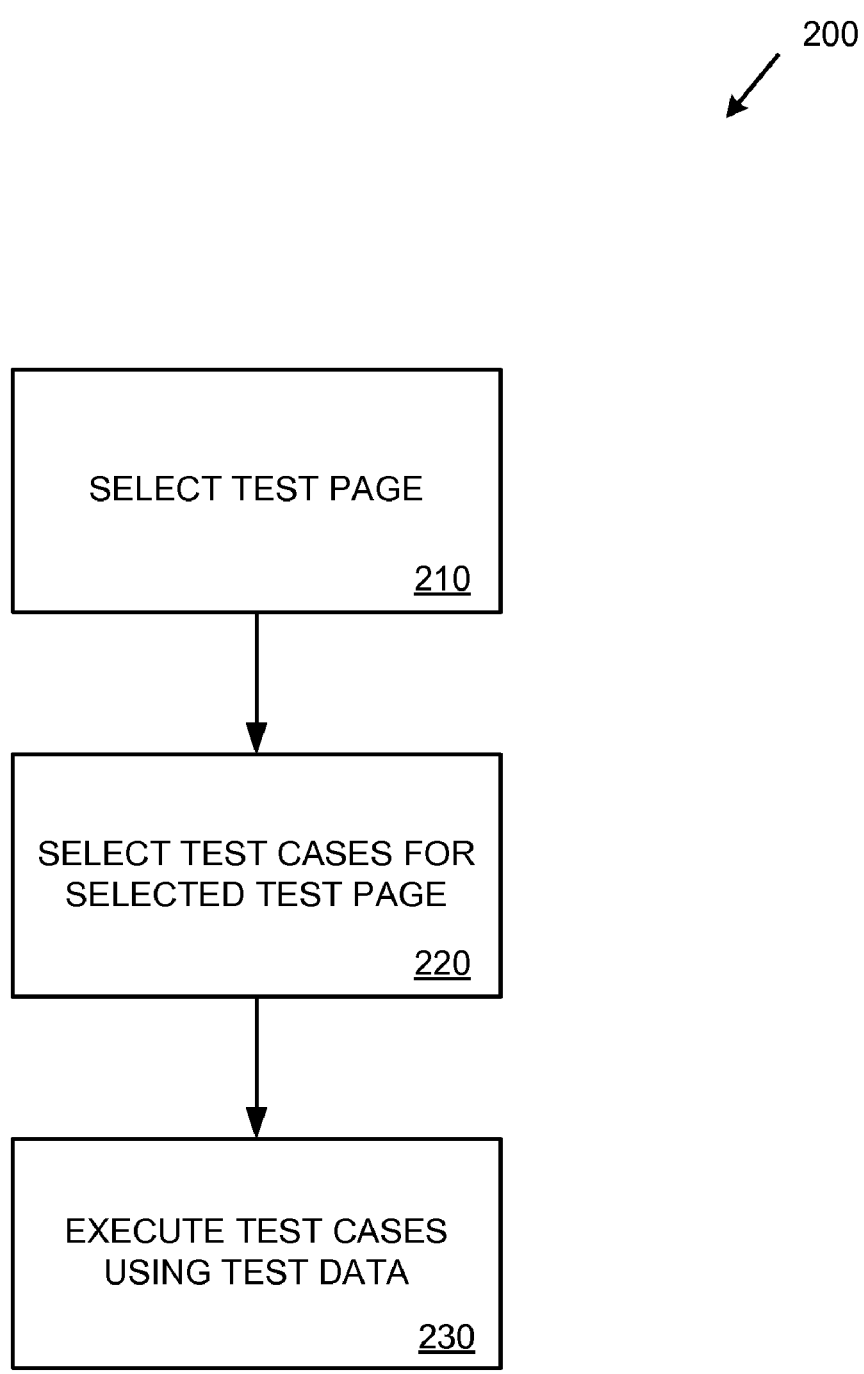
FIG. 2 is a flowchart showing an exemplary method for testing software.
Figure 3:
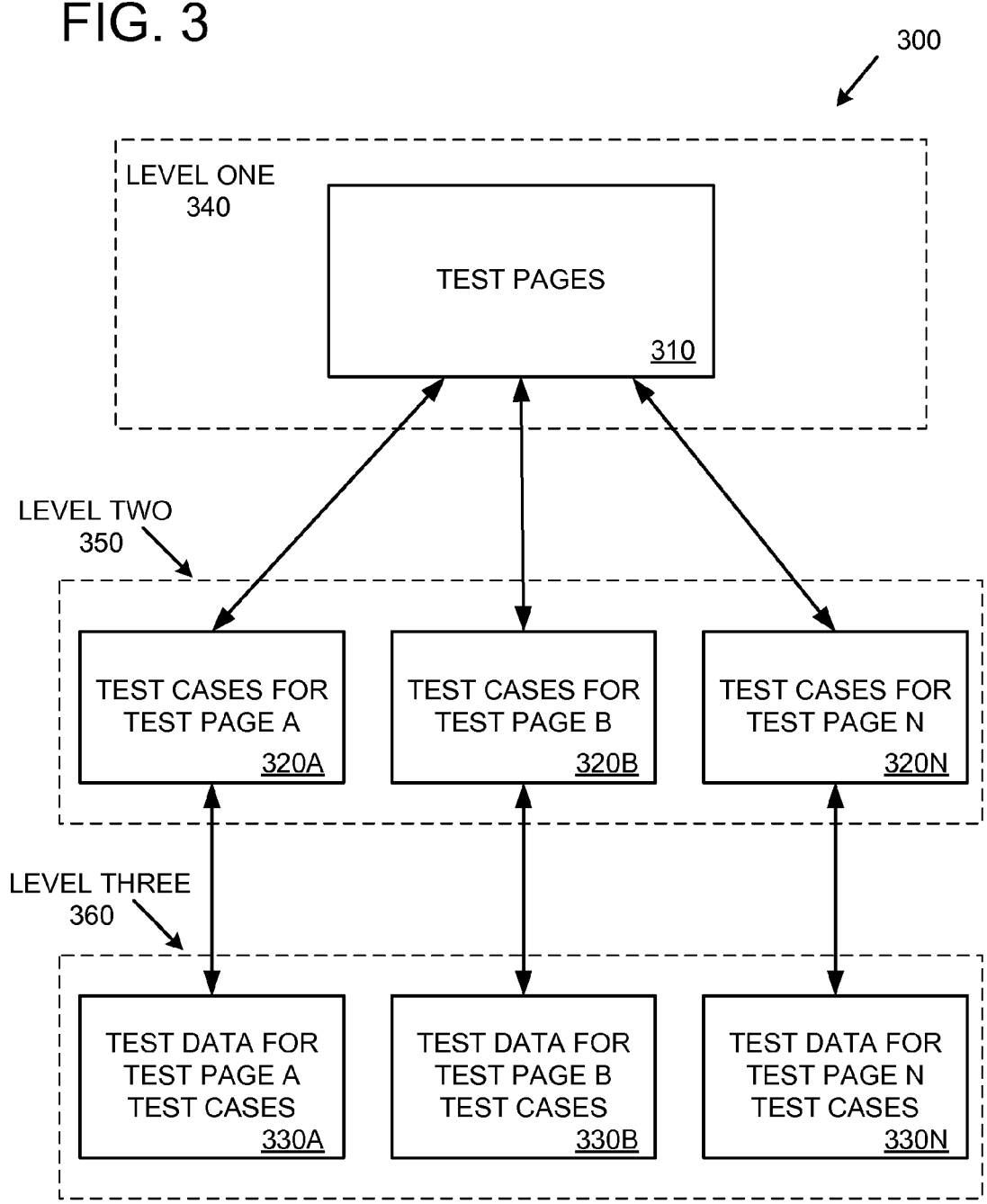
FIG. 3 is a diagram showing an exemplary three-level software testing framework for testing multi-stage scenarios.
Figure 7:
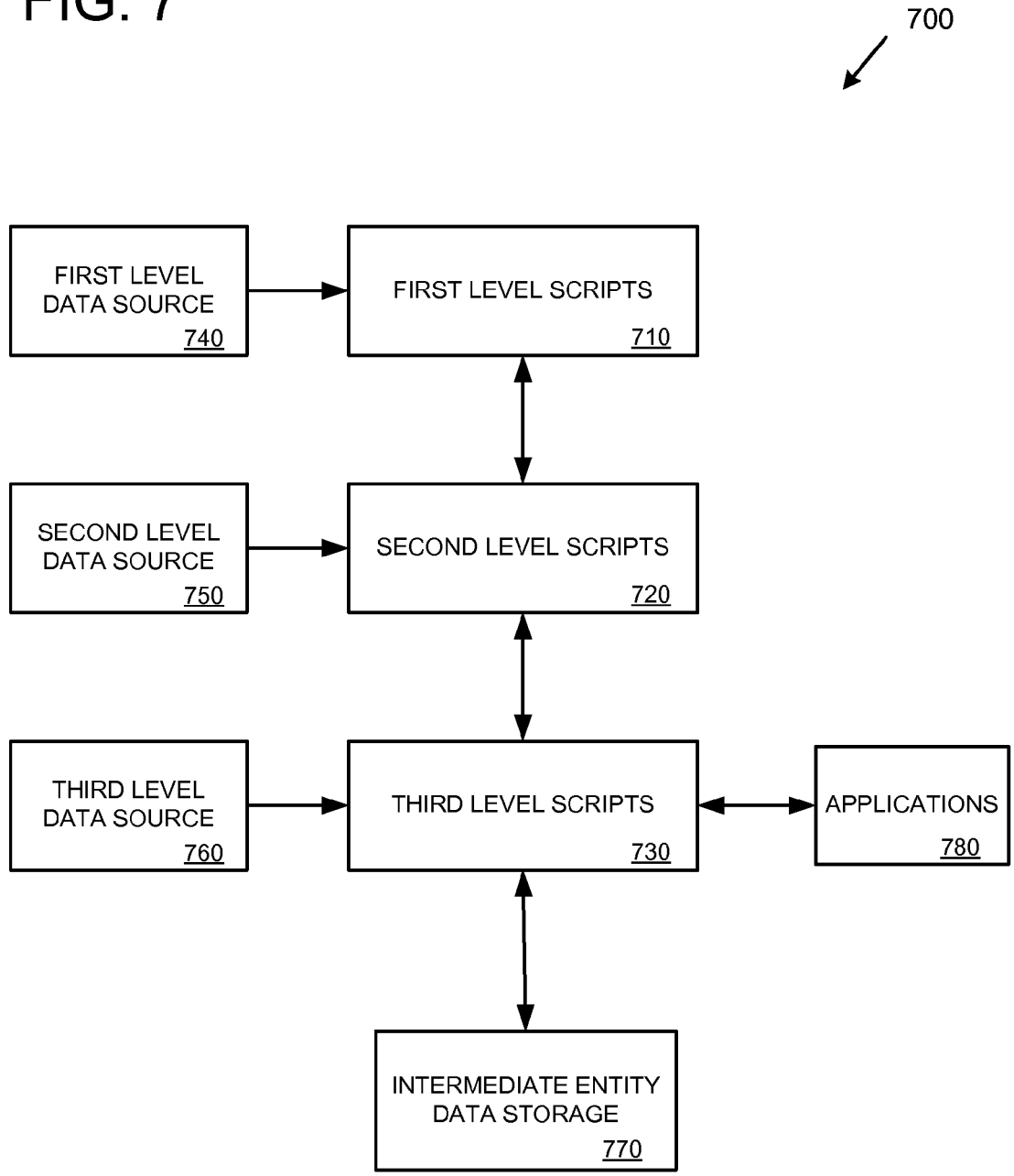
FIG. 7 is a diagram showing an exemplary three-level software testing framework comprising scripts and data sources.

FIG. 2 shows an exemplary method 200 for testing software (e.g., using a three-level software testing framework), and can be performed, for example, using a framework such as that shown in FIGS. 1, 3, and 7. At 210, a test page is selected. For example, the test page can correspond to one stage of a multi-stage scenario, where each stage of the multi-stage scenario can correspond to a test page. For example, a script can select the test page from a data source, such as a spreadsheet. The script can select the test page based on a flag column in the spreadsheet.

At 220, test cases are selected for the selected test page 210. For example, a script can select the test cases from a data source, such as a spreadsheet.

At 230, the selected test cases can be executed using test data. The test data can be retrieved from a data source, such as a spreadsheet. A script can execute the test cases using the test data.

The method 200 can be performed by one or more scripts. For example, a first script can perform 210, a second script can perform 220, and a third script can perform 230.

EXAMPLE 14

Exemplary Three-Level Software Testing Framework for Testing Multi-Stage Scenarios FIG. 3 shows an exemplary three-level software testing framework 300 for testing multi-stage scenarios. The example framework includes a first level 340. The first level 340 comprises test pages 310. For example, the test pages 310 can be listed in a single spreadsheet. Each test page can correspond to a stage of a multi-stage scenario.

The example framework includes a second level 350. The second level 350 comprises test cases, 320A-N, for the test pages 310. Each of the test pages is associated with a separate set of test cases (e.g., 320A, 320B, or 320N). In the example framework 300, the test cases 320A are the test cases for "Test Page A" (one of the test pages 310). The test cases 320B are the test cases for "Test Page B," and the test cases 320N are the test cases for "Test Page N."

The example framework includes a third level 360. The third level 360 comprises test data, 330A-N, for the test cases, 320A-N. Each of the test cases is associated with its test data. In the example framework 300, the test data 330A is the test data for use when executing the test cases 320A, the test data 330B is the test data for use when executing the test cases 320B, and test data 330N is the test data for use when executing the test cases 320N.

Using the framework 300, intermediate entities can be saved and reused. For example, intermediate entities can be saved as a result of executing test cases 320A. Then, when executing subsequent test cases (e.g., 320B or 320N), the intermediate entities can be reused.

The framework 300 can be used to separate the stages of the multi-stage scenario. For example, a first test page of the test pages 310, and the first test page's associated test cases 320A and test data 330A, can correspond to a first stage of the multi-stage scenario (e.g., open checking accounts). A second test page of the test pages 310, and the second test page's associated test cases 320B and test data 330B, can correspond to a second stage of the multi-stage scenario (e.g., make deposits to the checking accounts). And a third test page of the test page 310, and the third test page's associated test cases 320N and test data 330N can correspond to a third stage of the multi-stage scenario (e.g., close the checking accounts). In this way multi-stage scenarios comprising an arbitrary number of stages can be tested using the framework 300.

EXAMPLE 15

Exemplary Method for Reusing Intermediate Entities

Figure 4:
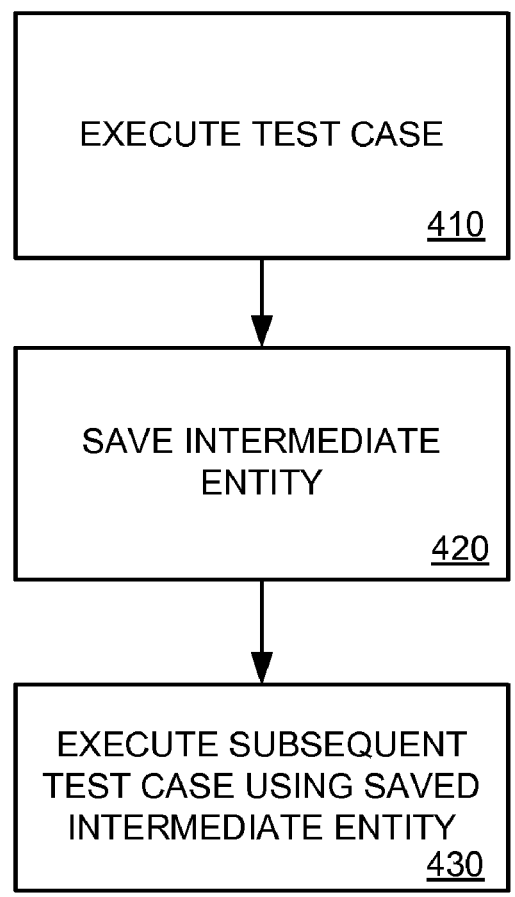
FIG. 4 is a flowchart showing an exemplary method for reusing intermediate entities.

FIG. 4 shows an exemplary method 400 for reusing intermediate entities during software testing, and can be performed, for example, using a framework such as that shown in FIGS. 1, 3, and 7. At 410, a test case is executed (e.g., by a script). For example the test case can be used to open an individual savings account with a specific configuration (e.g., a specific interest rate).

At 420, an intermediate entity, generated as a result of the execution of the test case 410, is saved. For example, the intermediate entity can be an account ID for the opened individual savings account. The intermediate entity can be saved in a file (e.g., a spreadsheet).

At 430, a subsequent test case is executed (e.g., by a script) using the saved intermediate entity 420. For example, the subsequent test case can be used to make a deposit, make a withdrawal, perform a transfer, calculate interest, or close the account. The intermediate entity can be retrieved or read (e.g., by a script) from a file (e.g., from the spreadsheet) during execution of the subsequent test case 430.

Intermediate entities can be saved, for example, in an output spreadsheet (e.g., at 420). The intermediate entities in the output spreadsheet can then be copied to an input spreadsheet. When subsequent test cases are executed, the intermediate entities can be read from the input spreadsheet and used (e.g., at 430).

EXAMPLE 16

Exemplary Method for Reusing Intermediate Entities in Subsequent Test Cases

Figure 5:
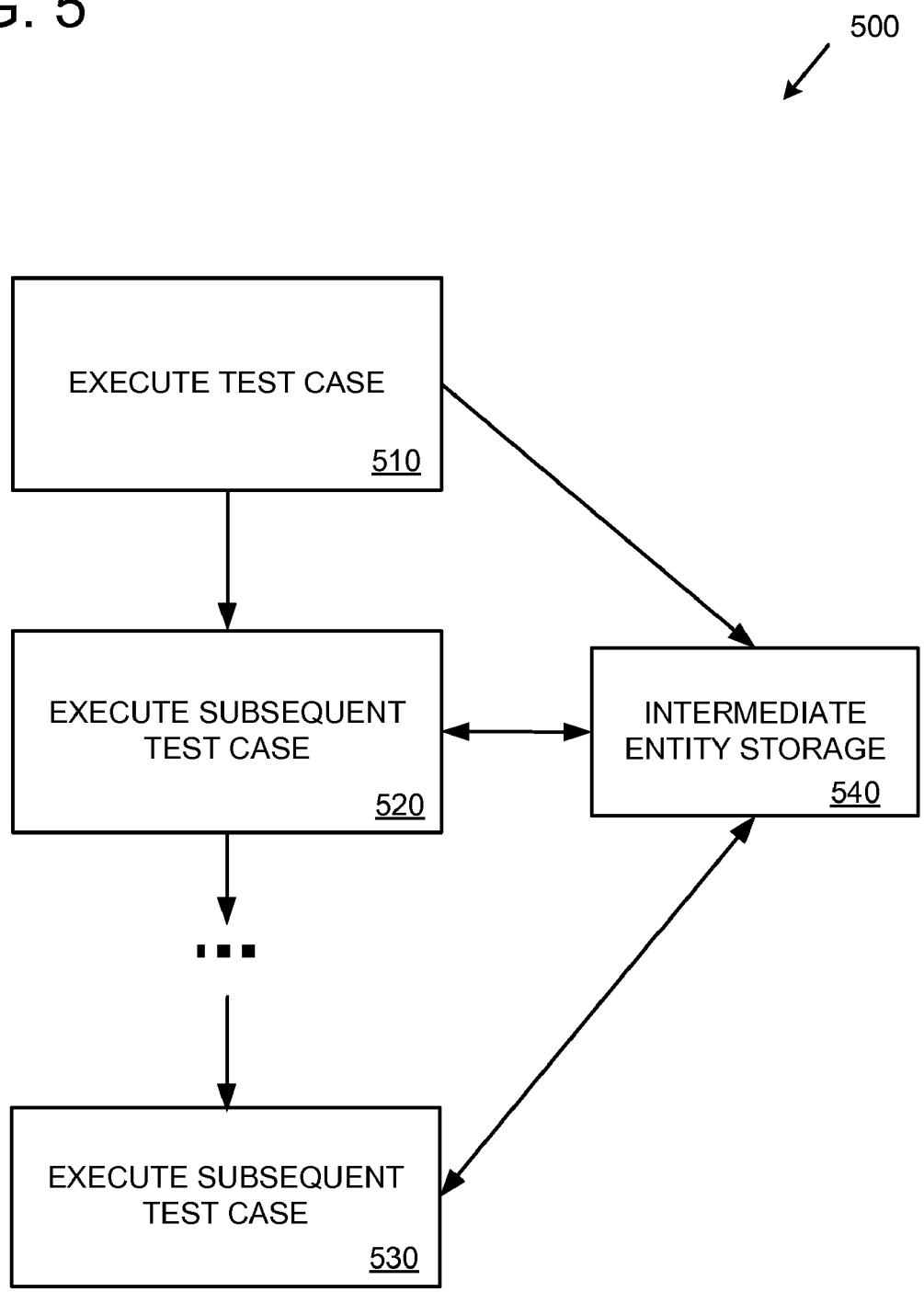
FIG. 5 is a flowchart showing an exemplary method for reusing intermediate entities in subsequent test cases.

FIG. 5 shows an exemplary method 500 for reusing intermediate entities in subsequent test cases during software testing, and can be performed, for example, using a framework such as that shown in FIGS. 1, 3, and 7. At 510, a test case is executed (e.g., by a script). For example the test case can be used to open an individual savings account with a specific configuration (e.g., a specific interest rate). An intermediate entity generated as a result of the execution of the test case 510 can be stored in intermediate entity storage 540. The intermediate entity storage 540 can be any type of data storage (e.g., a database, file, spreadsheet, or another type of data storage).

At 520, a subsequent test case is executed (e.g., by a script). For example the test case can be used to make a deposit to the individual savings account. During execution of the subsequent test case 520, intermediate entities can be read from (e.g., retrieved from) intermediate entity storage 540 and used. For example, if an account ID intermediate entity is generated as a result of 510 and stored, it can be retrieved and used when executing the subsequent test case 520 (e.g., to make the deposit transaction to the account specified by the account ID). The execution of the subsequent test case 520 can also store intermediate entities in intermediate entity storage 540. For example, a transaction ID intermediate entity generated as a result of the deposit transaction can be saved in intermediate entity storage 540.

At 530, another subsequent test case is executed (e.g., by a script). For example the test case can be used to close the individual savings account. During execution of the subsequent test case 530, intermediate entities can be read from (e.g., retrieved from) intermediate entity storage 540 and used. For example, the account ID can be read and used. The execution of the subsequent test case 530 can also store intermediate entities in intermediate entity storage 540.

Any number of test cases (e.g., 510-530) be executed, and intermediate entities stored and retrieved from the intermediate entity storage 540. The test cases (e.g., 510-530) can be the test cases of a multi-stage scenario. Intermediate entities for other test cases (e.g., test cases for other multi-stage scenarios) can also be stored in, and retrieved from, the intermediate entity storage 540.

The intermediate entity storage 540 can comprise two spreadsheets. One spreadsheet can be an output spreadsheet into which intermediate entities are stored, and the other spreadsheet can be an input spreadsheet from which intermediate entities are read. After execution of a test case, the contents of the output spreadsheet can be copied to the input spreadsheet for use by the subsequent test case.

EXAMPLE 17

Figure 6:
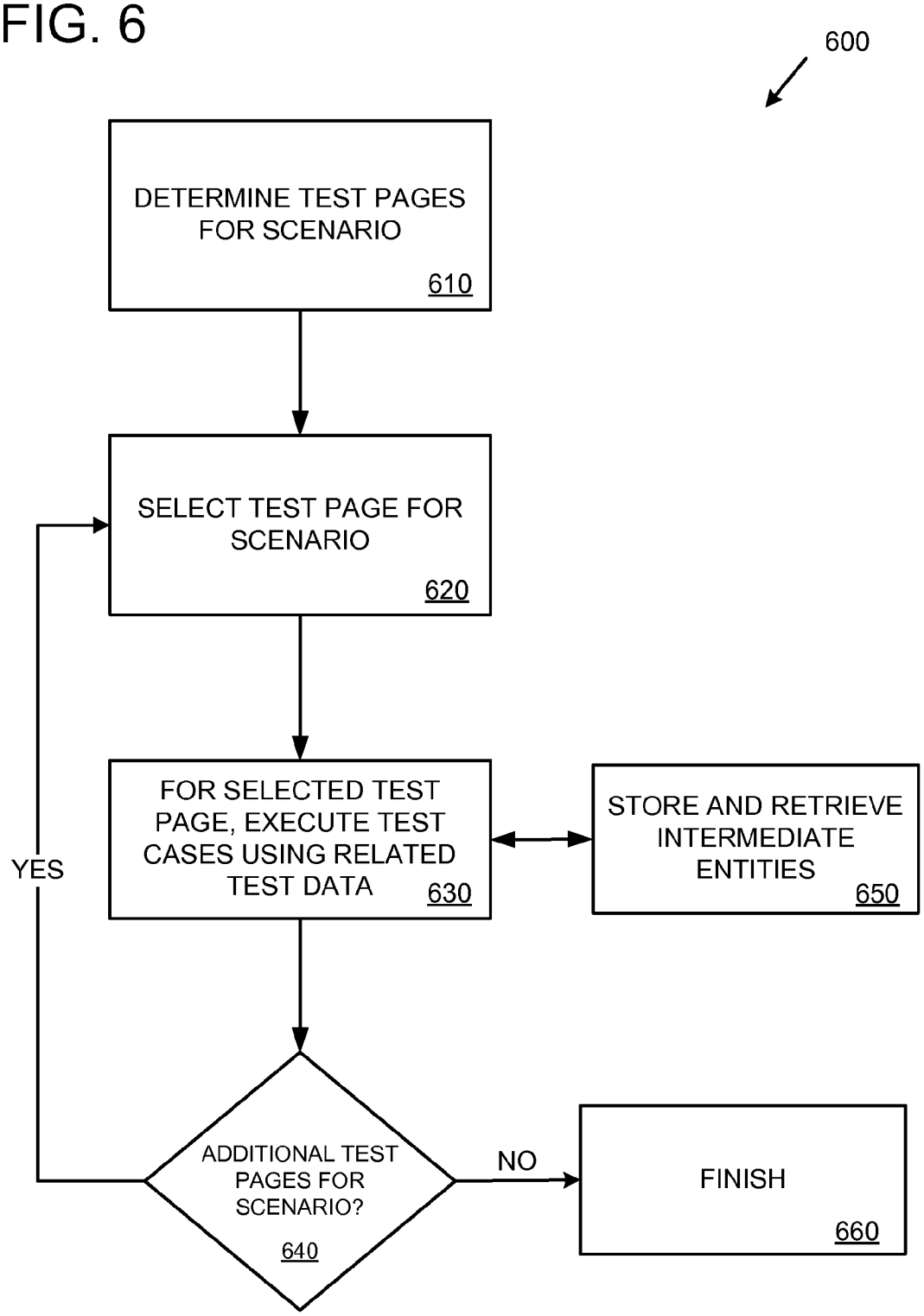
FIG. 6 is a flowchart showing an exemplary method for testing a multi-stage scenario using a three-level framework.

Exemplary Method for Testing a Multi-Stage Scenario using a Three-Level Framework FIG. 6 shows an exemplary method 600 for testing a multi-stage scenario using a three-level framework, and can be performed, for example, using a framework such as that shown in FIGS. 1, 3, and 7. At 610, a determination is made regarding which test pages to include for a multi-stage scenario. The test pages to include can be ordered sequentially to make up the scenario. The determination can be made using a spreadsheet listing test pages. For example, the test pages for the multi-stage scenario can be flagged in the spreadsheet.

At 620, a test page is selected. If no test pages have yet been selected for the scenario, then the first test page in the sequence is the one selected. Otherwise, the next test page in the sequence is selected.

At 630, one or more test cases are executed, using related test data, for the selected test page 620. During execution of the test cases 630, intermediate entities can be stored and/or retrieved 650. Once the test cases for the selected test page have been executed, the method proceeds to 640.

At 640, if there are additional test pages in the sequence for the multi-stage scenario, the method proceeds to 620. Otherwise, the method finishes 660.

For example, a multi-stage scenario can comprise the following test pages: open savings account, perform transfer transaction, check result of transaction, close account. Using this example multi-stage scenario, the method can determine that the multi-stage scenario comprises these four test pages in the listed sequence. The method can select the first test page (open savings account) at 620. At 630, the method can execute one or more test cases (e.g., execute three test cases: open an individual savings account using U.S. currency with a 3% interest rate, open a joint savings account using European currency with a 3% interest rate, and open a business savings account using Indian currency with a 4% interest rate). Intermediate entities can be stored and/or retrieved 650 during the execution (e.g., three different account IDs can be saved as a result of the three account opening test cases). At 640, the method can proceed back to 620 to select the next test page (perform transfer transaction). At 630, the test cases can be executed for the currently selected test page (e.g., three transfer transaction test case can be executed: a local currency transfer transaction for the individual savings account, a foreign currency transfer transaction for the joint savings account, and a transfer between linked accounts for the business savings account). During execution, intermediate entities can be stored and/or retrieved 650 (e.g., the three saved account IDs can be retrieved and used for the transfer transactions, and three transaction IDs can be stored as a result). Once the four test pages are complete, the method can finish 660 (e.g., testing the multi-stage scenario can finish).

EXAMPLE 18

Exemplary Three-Level Software Testing Framework Comprising Scripts and Data Sources FIG. 7 shows an exemplary three-level software testing framework 700, comprising scripts and data sources, for testing software applications. The framework 700 comprises one or more first level scripts 710 and a first level data source 740. The first level scripts 710 can control the testing of scenarios (e.g., multi-stage scenarios). For example, the first level scripts 710 can determine the test pages for the scenarios using the first level data source 740.

The framework 700 also comprises one or more second level scripts 720 and a second level data source 750. The second level scripts 720 can control selection of test cases for the test pages using the second level data source 750.

The framework 700 also comprises one or more third level scripts 730 and a third level data source 760. The third level scripts 730 can control execution of the test cases using test data from the third level data source 760. During execution of the test cases, the third level scripts 730 can store intermediate entities in, and retrieve intermediate entities from, intermediate entity data storage 770. The third level scripts 730 can execute the test cases by interacting with one or more software applications 780 (e.g., by interacting with a GUI of a software application, such as a GUI of a financial banking application).

Control can pass between the various levels of scripts. For example, control can start with the first level scripts 710, which select the test pages. The first level scripts 710 can then call (e.g., pass control to) the second level scripts (e.g., by passing a selected test page). The second level scripts 720 can select the test cases for the selected test page and then call (e.g., pass control to) the third level scripts (e.g. by passing one of the selected test cases). The third level scripts 730 can execute the test case. Once executed, the third level scripts 730 can call (e.g., pass control to) the second level scripts 720. Control can pass back and forth between the second level scripts 720 and third level scripts 730 until all selected test cases have been executed, at which time control can pass back to the first level scripts 710. The first level scripts 710 can then begin the process again by passing the next selected test page (e.g., the next test page of the multi-stage scenario) down to the second level scripts 720.

The exemplary software testing framework 700 can also be separated, for example, into a four-level framework. For example, the fourth level can comprise the intermediate entity data storage 770 (e.g., a fourth-level data source). The fourth level can also comprise fourth level scripts (not pictured).

EXAMPLE 19

Exemplary Computing Environment

Figure 8:
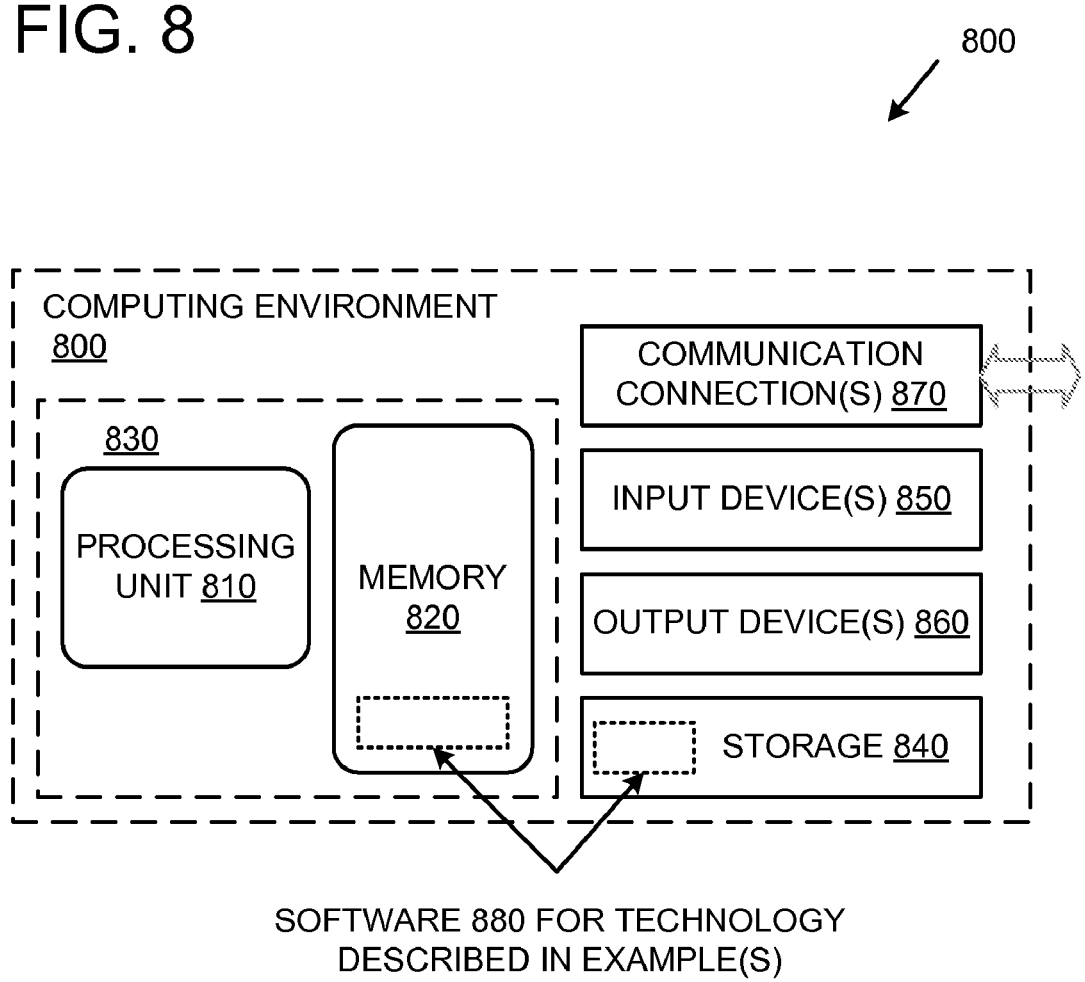
FIG. 8 is a block diagram illustrating an example of a computing environment that can be used to implement any of the technologies described herein.

FIG. 8 illustrates a generalized example of a suitable computing environment 800 in which described embodiments, techniques, and technologies may be implemented. The computing environment 800 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, the computing environment 800 includes at least one central processing unit 810 and memory 820. In FIG. 8, this most basic configuration 830 is included within a dashed line. The central processing unit 810 executes computer-executable instructions and may be a real or a virtual processor. In a multi-processing system, multiple processing units execute computer-executable instructions to increase processing power and as such, multiple processors can be running simultaneously. The memory 820 may be volatile memory (e.g., registers, cache, RAM), non-volatile memory (e.g., ROM, EEPROM, flash memory, etc.), or some combination of the two. The memory 820 stores software 880 that can, for example, implement the technologies described herein. A computing environment may have additional features. For example, the computing environment 800 includes storage 840, one or more input devices 850, one or more output devices 860, and one or more communication connections 870. An interconnection mechanism (not shown) such as a bus, a controller, or a network, interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. The storage 840 stores instructions for the software 880, which can implement technologies described herein.

The input device(s) 850 may be a touch input device, such as a keyboard, keypad, mouse, pen, or trackball, a voice input device, a scanning device, or another device, that provides input to the computing environment 800. For audio, the input device(s) 850 may be a sound card or similar device that accepts audio input in analog or digital form, or a CD-ROM reader that provides audio samples to the computing environment 800. The output device(s) 860 may be a display, printer, speaker, CD-writer, or another device that provides output from the computing environment 800.

The communication connection(s) 870 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 800. By way of example, and not limitation, with the computing environment 800, computer-readable media include memory 820, storage 840, communication media (not shown), and combinations of any of the above.

EXAMPLE 20

Exemplary Automated Methods

Any of the methods described herein can be performed via one or more computer-readable media (e.g., storage media) having computer-executable instructions for performing such methods. Operation can be fully automatic, semi-automatic, or involve manual intervention.

EXAMPLE 21

Exemplary Combinations

The technologies of any example described herein can be combined with the technologies of any one or more other examples described herein.

EXAMPLE 22

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer implemented automated software testing architecture comprising a three-level framework for testing multi-stage scenarios of software applications, the architecture comprising:

a computing device comprising a processing unit, memory, and computer-readable storage media, the computer-readable storage media comprising computer-executable instructions for causing the computing device to implement:

a first level of the three-level framework comprising an associated first data source, wherein the first data source specifies a plurality of test pages, wherein the plurality of test pages correspond to a plurality of stages of a multi-staged scenario, and wherein the plurality of test pages are selected via one or more first level scripts;

a second level of the three-level framework comprising an associated second data source, wherein the second data source specifies a plurality of test cases for the plurality of test pages, and wherein the plurality of test cases are selected via one or more second level scripts; and a third level of the three-level framework comprising an associated third data source, wherein the third data source contains test data for the plurality of test cases specified in the second data source, and wherein the test data in the third data source is used by one or more third level scripts when executing the plurality of test cases specified in the second data source;

an intermediate entity data source, wherein the intermediate entity data source is configured to store states for intermediate entities generated by the execution of the plurality of test cases by the one or more third-level scripts, and wherein the intermediate entity data source is configured to provide the stored states for intermediate entities for use by the one or more third-level scripts when executing subsequent test cases of the plurality of test cases;

wherein, for each test page of the plurality of test pages:
   a first level script of the one or more first level scripts calls a second level script of the one or more second level scripts, passing the test page;
   the second level script selects test cases for the test page, from the plurality of test cases, from the second data source and calls a third level script of the one or more third level scripts; and
   the third level script executes the selected test cases using test data associated with the selected test cases, from the test data.

2. The system of claim 1 wherein the first data source is a spreadsheet, and wherein the plurality of test pages are flagged in the spreadsheet.

3. The system of claim 1 wherein the second data source is a set of test case spreadsheets, wherein each of the plurality of test pages has an associated test case spreadsheet from the set of test case spreadsheets.

4. The system of claim 1 wherein the third data source is a set of test data spreadsheets, wherein each of the plurality of test pages has an associated test data spreadsheet from the set of test data spreadsheets.

5. The system of claim 1 wherein the intermediate entity data source comprises an output spreadsheet to which the states for intermediate entities are written and an input spreadsheet from which the states for intermediate entities are read.

6. A computer implemented method for testing multi-staged scenarios of a software application via a three-level software testing framework, the method comprising:
  by a computing device:
   selecting, by one or more first level scripts, a plurality of test pages corresponding to a plurality of stages of a multi-staged scenario;
   for the plurality of test pages:
    determining, by one or more second level scripts, a plurality of test cases to execute, wherein the plurality of test cases are related to a test page of the plurality of test pages, and wherein the plurality of test cases correspond to a plurality of sub-scenarios of the multi-staged scenario;
    executing, by one or more third level scripts, the plurality of test cases using test data;
    saving, by the one or more third level scripts, a plurality of states for intermediate entities generated as a result of the executing the plurality of test cases, wherein the saved plurality of states for intermediate entities are reused during the executing the plurality of test cases for subsequent test pages of the plurality of teat pages;
  wherein, for each of one or more test pages of the plurality of test pages:
   a first level script of the one or more first level scripts calls a second level script of the one or more second level scripts, passing the test page;
   the second level script selects the plurality of test cases to execute for the test page, from the plurality of test cases, and calls a third level script of the one or more third level scripts; and
   the third level script executes the selected plurality of test cases using test data associated with the selected plurality of test cases.

7. The method of claim 6 wherein the plurality of test pages are stored in a first data source, wherein the plurality of test cases are stored in a second data source, and wherein the test data is stored in a third data source.

8. The method of claim 6 wherein the selecting the plurality of test pages is performed at a first level of the three-level software testing framework, wherein the determining the plurality of test cases to execute is performed at a second level of the three-level software testing framework, and wherein the executing and the saving is performed at a third level of the three-level software testing framework.

9. One or more computer-readable storage media comprising computer-executable instructions for causing a computing device to perform the computer implemented method of claim 6.

10. A computer implemented method for testing a multi-staged scenario of a software application using an automated software testing architecture with a three-level framework, the method comprising:
  determining, at a first level of the three-level framework, a plurality of test pages, wherein the plurality of test pages correspond to a plurality of stages of the multi-staged scenario;
  selecting, at the first level of the three-level framework, a first test page of the plurality of test pages;
  determining, at a second level of the three-level framework, a first test case to execute corresponding to the first test page;
  executing, at a third level of the three-level framework, the first test case;
  saving, at the third level of the three-level framework, a state for an intermediate entity generated as a result of the executing the first test case;
  selecting, at the first level of the three-level framework, a second test page of the plurality of test pages, wherein the second test page is subsequent, in the multi-stage scenario, to the first test page;
  determining, at the second level of the three-level framework, a second test case to execute corresponding to the second test page;
  executing, at the third level of the three-level framework, the second test case, wherein the executing the second test case comprises retrieving the saved state for the intermediate entity, and wherein the retrieved state for the intermediate entity is used during the executing the second test case.

11. The method of claim 10 wherein the determining the plurality of test pages is performed by a first script, wherein the determining the first and second test cases is performed by a second script, and wherein the executing the first and second test cases, and the saving the state for the intermediate entity, is performed by a third script.

12. The method of claim 10 wherein the plurality of test pages are stored in a first data source associated with the first level of the three-level framework, and wherein the first test case and the second test case are stored in a second data source associated with the second level of the three-level framework.

13. The method of claim 10 wherein the plurality of test pages are stored in a first spreadsheet, wherein the first test case is stored in a second spreadsheet, and wherein the second test case is stored in a third spreadsheet.

14. The method of claim 10 wherein the state for the intermediate entity is saved in an intermediate entity data source.

15. The method of claim 14 wherein the intermediate entity data source comprises an output spreadsheet and an input spreadsheet.

16. The method of claim 10 wherein the executing the first test case comprises executing the first test case using test data, associated with the first test case, stored in a data source associated with the third level of the three-level framework, and wherein the executing the second test case comprises executing the second test case using test data, associated with the second test cases, stored in the data source associated with the third level of the three-level framework.

17. One or more computer-readable storage media comprising computer-executable instructions for causing a computing device to perform the computer implemented method of claim 10.

* * * * *

UNITED STATES PATENT AND TRADEMARK OFFICE
CERTIFICATE OF CORRECTION

| | | |
|---|---|---|
| PATENT NO. | : 7,664,989 B2 | Page 1 of 1 |
| APPLICATION NO. | : 11/550312 | |
| DATED | : February 16, 2010 | |
| INVENTOR(S) | : Joshi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 593 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

PATENT NO.        : 7,664,989 B2                                                     Page 1 of 1
APPLICATION NO.   : 11/550312
DATED             : February 16, 2010
INVENTOR(S)       : Joshi et al.

It is certified that error appears in the above-identified patent and that said Letters Patent is hereby corrected as shown below:

Column 18, line 12, "teat" should read --test--

Signed and Sealed this
Fourth Day of January, 2011

David J. Kappos
*Director of the United States Patent and Trademark Office*